United States Patent
Lee et al.

(10) Patent No.: US 8,472,800 B2
(45) Date of Patent: Jun. 25, 2013

(54) LIGHT AMOUNT ADJUSTING DEVICE, AND PHOTOGRAPHING APPARATUS AND METHOD

(75) Inventors: Kyung-bae Lee, Busan (KR); Jung-ho Park, Changwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 74 days.

(21) Appl. No.: 13/103,194

(22) Filed: May 9, 2011

(65) Prior Publication Data

US 2011/0293261 A1  Dec. 1, 2011

(30) Foreign Application Priority Data

May 28, 2010 (KR) .................. 10-2010-0050347

(51) Int. Cl.
*G03B 41/00* (2006.01)

(52) U.S. Cl.
USPC ................................................ 396/323

(58) Field of Classification Search
USPC ................................................ 396/323
See application file for complete search history.

(56) References Cited

U.S. PATENT DOCUMENTS

| | | | |
|---|---|---|---|
| 5,122,650 A | 6/1992 | McKinley | |
| 5,294,951 A * | 3/1994 | Lo | 396/323 |
| 5,471,237 A | 11/1995 | Shipp | |
| 5,625,435 A * | 4/1997 | Lo et al. | 355/22 |
| 5,666,579 A * | 9/1997 | Camello | 396/323 |
| 5,678,089 A * | 10/1997 | Bacs et al. | 396/324 |
| 5,802,410 A * | 9/1998 | Wah Lo et al. | 396/330 |
| 5,828,487 A | 10/1998 | Greening et al. | |
| 5,842,064 A * | 11/1998 | Day | 396/330 |
| 5,933,664 A * | 8/1999 | Bacs, Jr. | 396/324 |
| 5,991,551 A * | 11/1999 | Bacs et al. | 396/324 |
| 6,151,164 A | 11/2000 | Greening et al. | |
| 6,233,003 B1 * | 5/2001 | Ono | 348/47 |
| 6,977,674 B2 * | 12/2005 | Seo | 348/207.99 |
| 7,639,934 B2 * | 12/2009 | Ziemkowski et al. | 396/55 |
| 7,983,543 B2 * | 7/2011 | Shibata | 396/52 |
| 2002/0028014 A1 * | 3/2002 | Ono | 382/154 |
| 2002/0171740 A1 * | 11/2002 | Seo | 348/207.99 |
| 2005/0140820 A1 * | 6/2005 | Takeuchi et al. | 348/362 |
| 2005/0276588 A1 * | 12/2005 | Tsutsumi | 396/55 |
| 2007/0081815 A1 * | 4/2007 | Zomet et al. | 396/327 |
| 2007/0133967 A1 * | 6/2007 | Takahashi et al. | 396/55 |
| 2008/0151065 A1 * | 6/2008 | Okumura et al. | 348/208.4 |
| 2008/0278572 A1 * | 11/2008 | Gharib et al. | 348/49 |
| 2009/0060485 A1 * | 3/2009 | Takahashi | 396/55 |

FOREIGN PATENT DOCUMENTS

| | | |
|---|---|---|
| KR | 1020030093533 A | 12/2003 |
| KR | 1020030093534 A | 12/2003 |
| KR | 1020070088876 A | 8/2007 |

* cited by examiner

*Primary Examiner* — Rodney Fuller
(74) *Attorney, Agent, or Firm* — Drinker Biddle & Reath LLP

(57) ABSTRACT

A light amount adjusting device including a support plate comprising a first through hole through which light passes; a first slider that comprises a second through hole corresponding to the first through hole, and linearly moves with respect to the support plate along a first direction; a first driver for generating a driving force for moving the first slider with respect to the supporting plate; and a light amount adjuster installed on the first slider and for adjusting an amount of light passing through the light amount adjuster. By using such a simple and compact light amount adjusting device, a two-dimensional (2D) photographing or a three-dimensional photographing is conveniently selected and performed.

20 Claims, 15 Drawing Sheets

LIGHT AMOUNT ADJUSTING DEVICE, AND PHOTOGRAPHING APPARATUS AND METHOD

CROSS-REFERENCE TO RELATED PATENT APPLICATION

This application claims the benefit of Korean Patent Application No. 10-2010-0050347, filed on May 28, 2010, in the Korean Intellectual Property Office, the disclosure of which is incorporated herein in its entirety by reference.

BACKGROUND

One or more embodiments of the invention relate to light amount adjusting devices, and photographing apparatuses and methods, and more particularly, to photographing apparatuses and methods in which a simple and compact light amount adjusting device is used to selectively perform two-dimensional (2D) photographing or three-dimensional (3D) photographing, and light amount adjusting devices for the photographing apparatuses and methods.

A three-dimensional (3D) image exhibits a 3D effect that allows a viewer to feel that he or she is seeing a 3D object. In the past, the 3D effect was used in limited fields such as heath care fields. However, recently, various visual media using 3D images have been developed, and 3D television (TV) technologies for residential use have been rapidly developed.

In order to provide a 3D image, images that are simultaneously captured at different angles need to be shown to a viewer's two eyes. Thus, a 3D photographing apparatus has a different operational structure from a 2D photographing apparatus. Various types of apparatuses have been used as 3D photographing apparatuses. However, since images that are simultaneously captured at different angles are required, an optical or mechanical structure of a 3D photographing apparatus is more complicated than that of a 2D photographing apparatus. In addition, since a 3D photographing apparatus obtains a 3D image only, a user may be inconvenienced by using a separate camera in order to capture a 2D image.

SUMMARY

One or more embodiments of the invention provide photographing apparatuses for selectively capturing a two-dimensional (2D) image or a three-dimensional (3D) image, and light amount adjusting devices for the photographing apparatuses.

One or more embodiments of the invention provide simple and compact light amount adjusting devices for performing a 3D photographing operation, and photographing apparatuses including the simple and compact light amount adjusting devices.

According to an embodiment of the invention, there is provided a light amount adjusting device including a support plate including a first through hole through which light passes; a first slider that includes a second through hole corresponding to the first through hole, and linearly moves with respect to the support plate along a first direction; a first driver for generating a driving force for moving the first slider with respect to the supporting plate; and a light amount adjuster installed on the first slider and for adjusting an amount of light passing through the light amount adjuster.

The light amount adjusting device may further include a stopper that is installed on any one of the first slider and the support plate in order to restrict movement of the first slider in the first direction.

The first slider may be coupled to the support plate to slide with respect to the support plate through a linear guide extending in the first direction interposed between the first slider and the support plate.

The linear guide may include a rail disposed on one of the support plate and the first slider to extend in the first direction, and a sliding block disposed on the other one of the support plate and the first slider to slide along the rail.

The light amount adjusting device may further include a detector for detecting a relative position of the first slider with respect to the support plate.

The first driver may include an ultrasonic motor for converting ultrasonic vibrations into linear movement of the first slider.

The first driver may include a first coil disposed on one of the support plate and the first slider, and a first magnet portion disposed on the other one of the support plate and the first slider to correspond to the first coil.

A second slider may be interposed between the light amount adjuster and the first slider so that the light amount adjuster linearly moves along a second direction crossing the first direction, and the light amount adjuster may further include a second driver for generating a driving force for moving the second slider.

The light amount adjusting device may further include a stopper installed on any one of the first slider and the second slider to restrict movement of the second slider in the second direction.

The second slider may be coupled to the first slider through a linear guide including a rail that is disposed on one of the first slider and the second slider to extend in the second direction, and a sliding block disposed on the other one of the first slider and the second slider to slide along the rail.

The light amount adjusting device may further include a detector for detecting a relative position of the second slider with respect to the first slider.

The second driver may include an ultrasonic motor for converting ultrasonic vibrations into linear movement of the second slider.

The light amount adjuster may be coupled to the first slider to linearly move in a second direction crossing the first direction, the first driver may include a first coil disposed on one of the support plate and the light amount adjuster, and a first magnet portion that is disposed on the other one of the support plate and the light amount adjuster to correspond to the first coil, and the light amount adjusting device may further include a second driver including a second coil that is disposed on one of the support plate and the light amount adjuster, and a second magnet portion disposed on the other one of the support plate and the light amount adjuster, and that generates a driving force for moving the light adjuster to the second direction with respect to the first slider.

According to another embodiment of the invention, there is provided a photographing apparatus including a plurality of lenses disposed along an optical axis; a light amount adjuster disposed on a predetermined position between the plurality of lenses to linearly move along at least one direction crossing the optical axis and for adjusting an amount of light passing through the light amount adjuster; an imaging device for converting light passed the plurality of lenses and the light amount adjuster into an electrical signal; a first driver for generating a driving force for moving the light amount adjuster along the at least one direction; and a controller for controlling the imaging device and the first driver to perform a photographing operation, and for selecting and performing any one of a two-dimensional (2D) photographing mode in which the photographing operation is performed when the light amount adjuster moves to a central position that matches the optical axis, and a three-dimensional (3D) photographing mode in which a first image is captured by moving the light amount adjuster to a first position in which the light amount adjuster is offset from the optical axis towards one side, and a second image is captured by moving the light amount adjuster to a second position in which the light amount adjuster is offset from the optical axis towards the other side.

The photographing apparatus may further include a support plate including a first through hole through which light passes; and a first slider that includes a second through hole corresponding to the first through hole, supports the light amount adjuster, and is coupled to the support plate to linearly move along a first direction, wherein the first driver linearly moves the first slider with respect to the support plate.

The photographing apparatus may further include a direction detector for detecting a rotational direction of the photographing apparatus, wherein, during the 3D photographing mode, when the direction detector recognizes that the photographing apparatus is positioned in parallel to the ground, the controller controls the first driver to move the first slider, and when the direction detector recognizes that the photographing apparatus is positioned perpendicular to the ground, the controller controls the second driver to move the second slider.

According to another embodiment of the invention, there is provided a photographing method using a plurality of lenses disposed along an optical axis; a light amount adjuster disposed on a predetermined position between the plurality of lenses and for adjusting an amount of light, and an imaging device for converting light passing the plurality of lenses and the light amount adjuster into an electrical signal, the photographing method including linearly moving the light amount adjuster along at least one direction crossing the optical axis; and selecting and performing any one of a two-dimensional (2D) photographing mode in which the photographing operation is performed when the light amount adjuster moves to a central position that matches the optical axis, and a three-dimensional (3D) photographing mode in which a first image is captured by moving the light amount adjuster to a first position in which the light amount adjuster is offset from the optical axis towards one side, and a second image is captured by moving the light amount adjuster to a second position in which the light amount adjuster is offset from the optical axis towards the other side.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, a light amount adjusting device and a photographing apparatus will be described with regard to exemplary embodiments of the invention with reference to the attached drawings.

Figure 1:
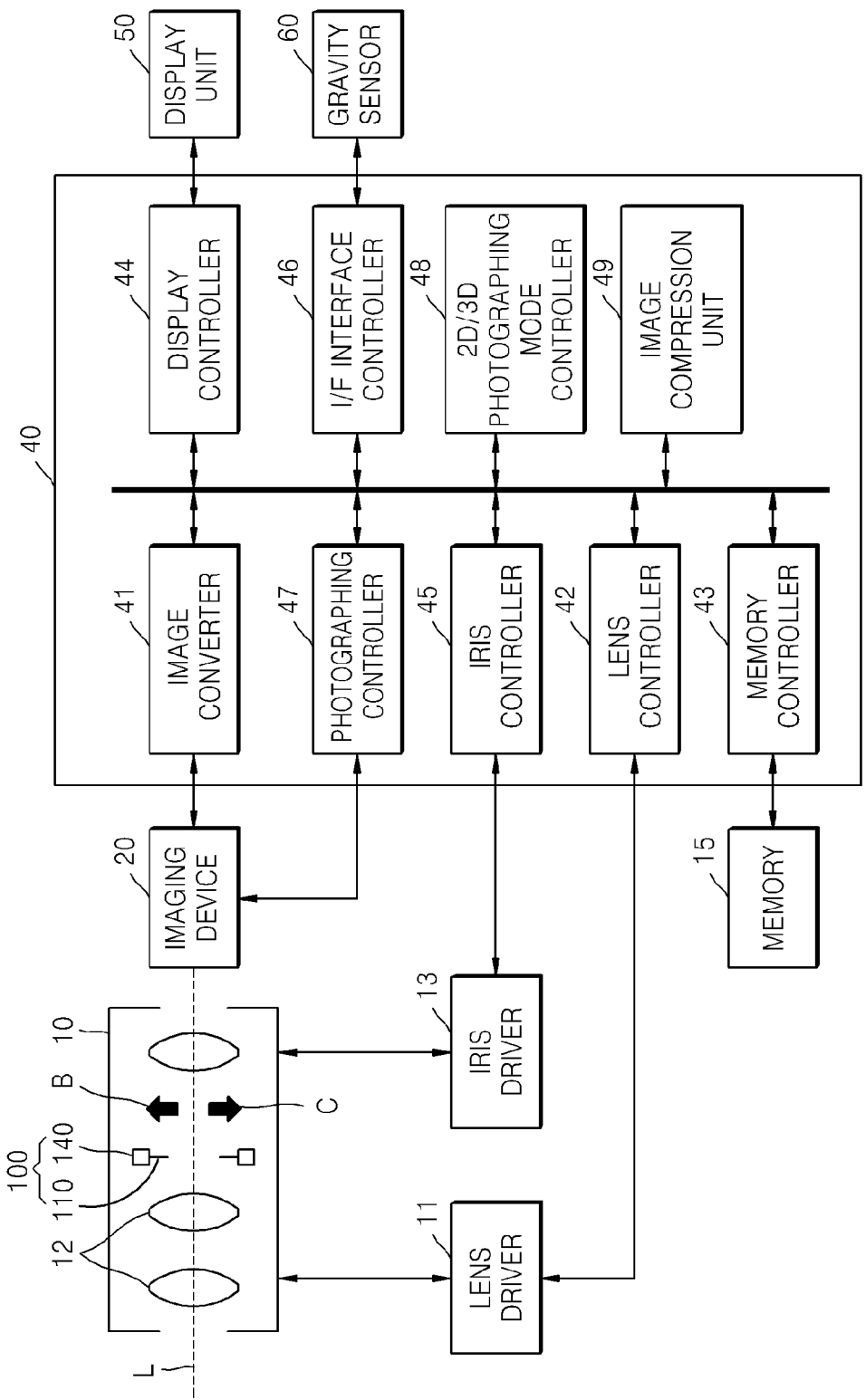
FIG. 1 is a block diagram for explaining a relationship between components of a photographing apparatus according to an embodiment of the invention.

FIG. 1 is a block diagram for explaining relationship a between components of a photographing apparatus according to an embodiment of the invention.

The photographing apparatus of FIG. 1 includes a plurality of lenses 12, an iris unit 110 that is moveably disposed on an optical axis L to adjust an amount of light that may pass through the lenses 12, an imaging device 20 for converting light passed through the lenses 12 and the iris unit 110 into an electrical signal, a first driver 140 for driving the iris unit 110, and a controller 40 for controlling the imaging device 20 and the first driver 140 to execute a two-dimensional (2D) photographing mode or a three-dimensional (3D) photographing mode. When the photographing apparatus including these components is used, the 2D photographing mode for obtaining a 2D image when a center of the iris unit 110 matches the optical axis L or the 3D photographing mode for obtaining a 3D image when the center of the iris unit 110 is offset from the optical axis L may be selected, and then a photographing operation may be performed. The photographing apparatus according to the present embodiment may be embodied in any of various forms such as a digital still camera for capturing a still image, a digital video camera for capturing a moving picture, and the like.

In a photographing operation, the imaging device 20 captures an image of a subject, and converts the image into an electrical signal. The electrical signal generated by the imaging device 20 is converted into image data by an image converter 41. A photographing controller 47 of the controller 40 controls the imaging device 20 to perform the photographing operation.

The lenses 12 and an iris assembly 100 including the iris unit 110 and the first driver 140 are disposed in front of the imaging device 20 and form an image on an imaging surface of the imaging device 20. The lenses 12 are moveably disposed to allow intervals therebetween to be changed. The intervals between the lenses 12 may be changed to adjust a zoom magnification and a focal point.

The iris assembly 100 is an example of a light amount adjusting device according to an embodiment of the invention. The iris unit 110 is an example of a light amount adjuster. The light amount adjusting device and the light amount adjuster are not limited to the iris assembly 100 and the iris unit 110, which will be described later, and may have any of various forms. For example, the light amount adjusting device and the light amount adjuster may be embodied by using an electrical shutter method using a liquid crystal device that changes a light amount that may pass therethrough according to a control signal, instead of a mechanical shutter.

The lenses 12 are disposed along the optical axis L, and the optical axis L is a straight line connecting optical centers of the lenses 12. Thus, when the center of the iris unit 110 of the iris assembly 100 matches the optical axis L, a 2D image may be obtained. When the center of the iris unit 110 of the iris assembly 100 is offset from the optical axis L, a first image and a second image may be captured to obtain a 3D image.

The lenses 12 are driven by a lens driver 11 including a driver such as a zoom motor (not shown) so that positional relationships between the lenses 12 may be changed. The lenses 12 may include a zoom lens for enlarging or reducing a size of a subject, and a focus lens for adjusting a focal point. The lens driver 11 operates by receiving a control signal from a lens controller 42 of the controller 40, and controls positions of the lenses 12 so that the lenses 12 may have any one magnification from among a plurality of magnifications.

The imaging device 20 includes a photoelectric transformation device such as a charge coupled device (CCD) or a complementary metal oxide semiconductor (CMOS), and converts image light that is incident on the image device 20 through the lenses 12 and the iris unit 110 into an electrical signal. The imaging device 20 is driven by a control signal applied from the photographing controller 47.

The image converter 41 image-processes an electrical signal of the imaging device 20, or converts the electrical signal into image data to be stored in a storage medium such as a memory 15. For example, the image converter 41 converts the electrical signal of the imaging device 20 into RGB data, and then converts the RGB data into raw data with a form such as a YUV signal including a brightness (Y) signal and a chrominance (UV) signal.

A process of converting an analog electrical signal of the imaging device 20 in the image converter 41 may include reducing driving noise in the electrical signal, wherein the driving noise may be generated due to the imaging device 20, via, for example, a correlated double sampling (CDS) circuit, adjusting gain of the noise-reduced signal via an automatic gain controlling (AGC) circuit, converting the gain-adjusted signal into a digital signal via an analog/digital (A/D) converter, and performing signal-processes such as pixel defect correction, gain correction, white balance correction, and gamma correction on the digital signal. In this case, the CDS circuit, the AGC circuit, the A/D converter, and the like may be configured as separate circuits.

The controller 40 is electrically connected to the imaging device 20, the lens driver 11, a display unit 50, and the like, transmits and receives control signals to and from these components in order to control their operations, and processes data.

The controller 40 includes the image converter 41, the lens controller 42, a memory controller 43, a display controller 44, an iris controller 45, an input/output interface (I/F) controller 46, the photographing controller 47, a 2D/3D photographing mode controller 48, and an image compression unit 49.

The controller 40 may be embodied by a microchip or a circuit board including the microchip. Each component included in the controller 40 may be embodied by software or a circuit included in the controller 40.

The memory controller 43 controls the memory 15 to record data and to read data or setting information stored in the memory 15.

The memory 15 may be a volatile embedded memory, and may include a semiconductor memory element, for example, a synchronous dynamic random access memory (SDRAM). The memory 15 may function as a buffer memory for temporally storing image data generated by the image converter 41, and as a working memory for data processing.

The memory 15 may instead be a non-volatile external memory, such as a memory stick, a flash memory such as secure digital/multi-media card (SD/MMC), a storage device such as a hard disk drive (HDD), or an optical storage device such as a digital video disk (DVD) or a compact disk (CD). In this case, the memory 15 may store image data that is compressed in a form such as a JPEG file, a TIF file, a GIF file, or a PCX file by the image compression unit 49.

The photographing apparatus may include the display unit 50 for displaying an image of image data. The display unit 50 may be, for example, a touch screen for detecting a touch on a surface of a display device such as a liquid crystal display device or an organic light emitting display device and generating a signal corresponding to the detected position.

The photographing apparatus may include a gravity sensor 60. The gravity sensor 60 may be a direction detector for detecting a rotational direction of a body 19 (see FIG. 7) of the photographing apparatus. A detect signal of the gravity sensor 60 is transmitted to the controller 40 through the I/F controller 46. The direction detector, that is, the gravity sensor 60, may be embodied by an accelerometer or a gyro sensor.

The 2D/3D photographing mode controller 48 sets a photographing mode from among the 2D photographing mode for obtaining a 2D image and the 3D photographing mode for obtaining a 3D image. An operational method of the iris controller 45 and the photographing controller 47 may be changed according to the set photographing mode.

An iris driver 13 is electrically connected to the iris assembly 100, and drives the first driver 140. For example, if the first driver 140 is embodied by a driver such as a motor, the iris driver 13 is embodied by a driver for generating a driving signal for driving the motor. In addition, the iris controller 45 of the controller 40 may apply a control signal to the iris driver 13, based on the set photographing mode.

Figure 2:
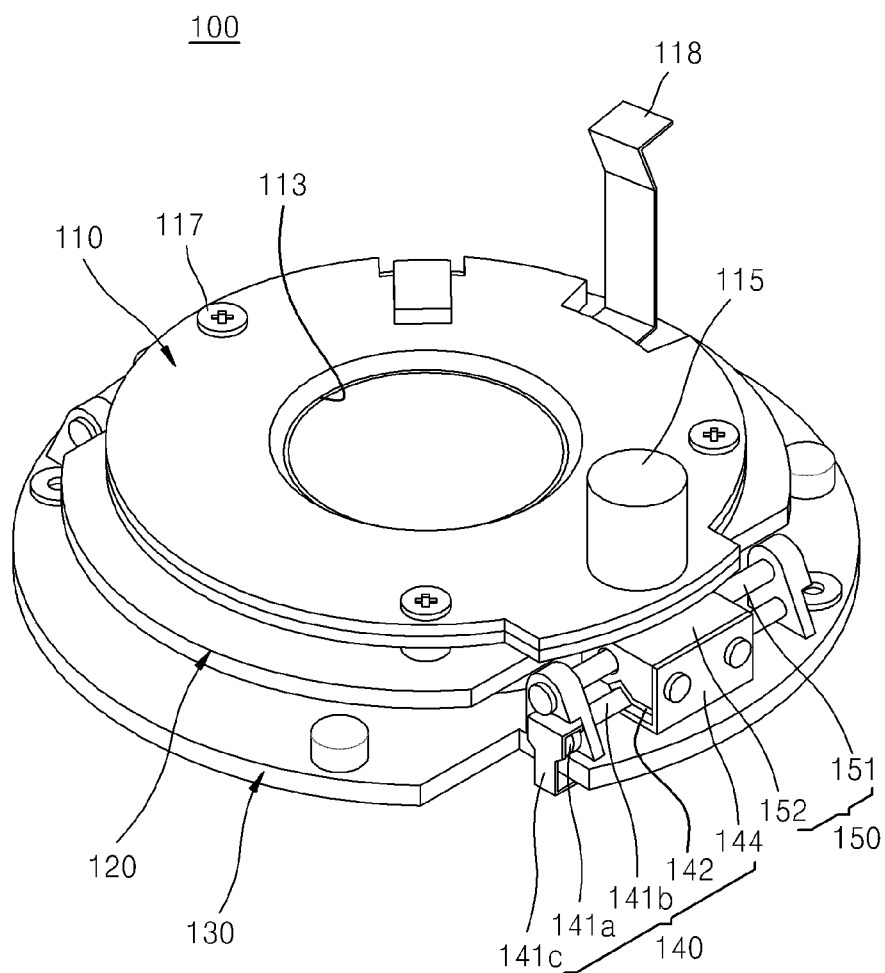
FIG. 2 is a perspective view of an iris assembly installed in the photographing apparatus of FIG. 1, wherein the iris assembly is an example of a light amount adjusting device.
Figure 3:
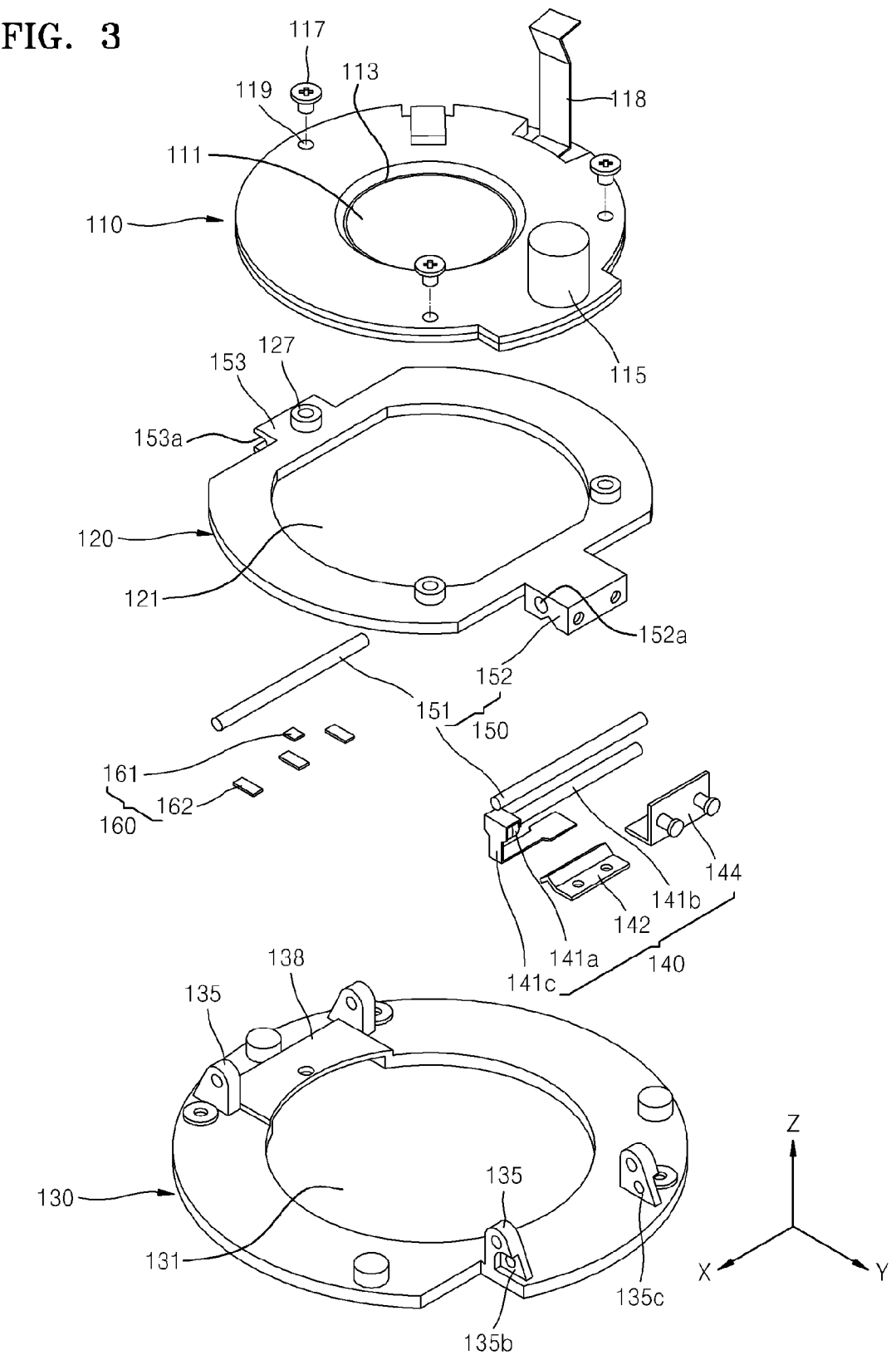
FIG. 3 is an exploded view of components of the light amount adjusting device of FIG. 2.
Figure 4:
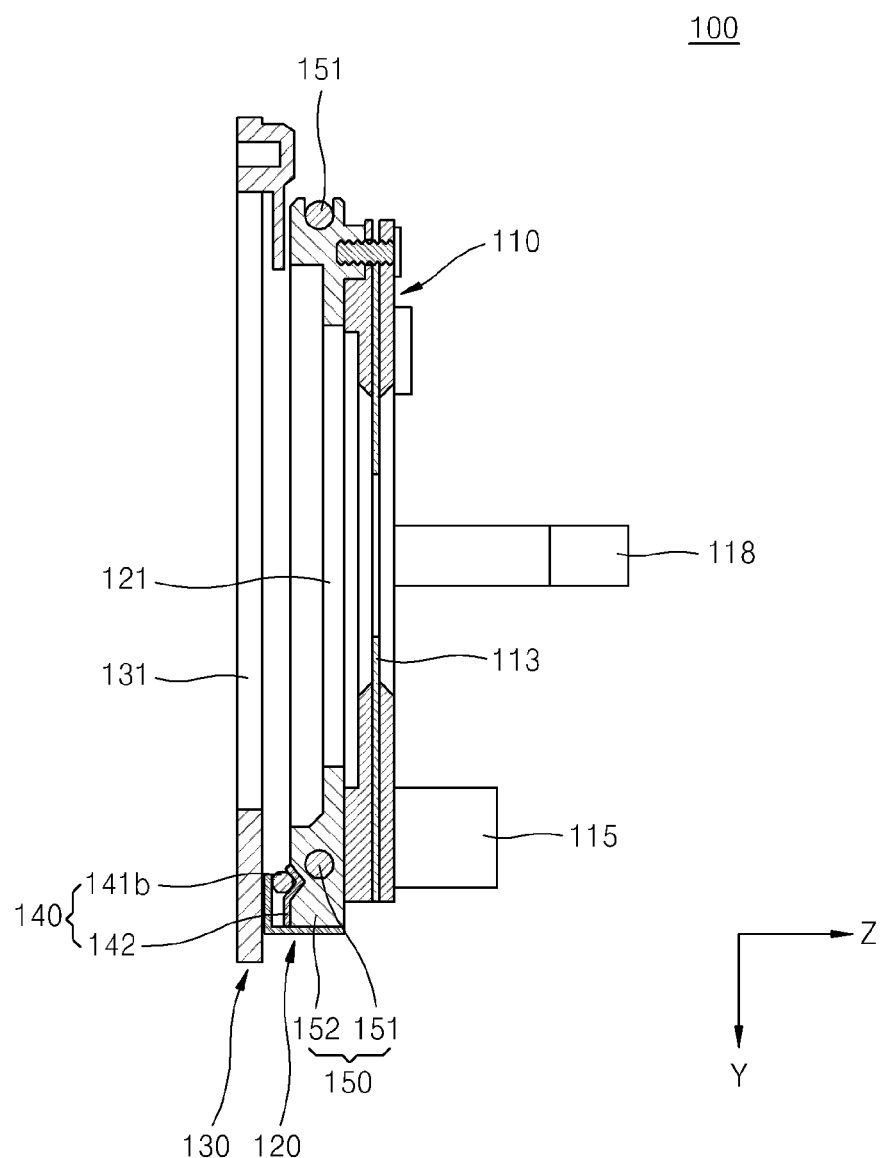
FIG. 4 is a lateral cross-sectional view of the light amount adjusting device of FIG. 2.

FIG. 2 is a perspective view of the iris assembly 100 installed in the photographing apparatus of FIG. 1, wherein the iris assembly 100 is an example of a light amount adjusting device. FIG. 3 is an exploded view of components of the light amount adjusting device of FIG. 2. FIG. 4 is a lateral cross-sectional view of the light amount adjusting device of FIG. 2.

Referring to FIGS. 2 through 4, the iris assembly 100 includes a support plate 130 including a first through hole 131 through which light may pass, a first slider 120 that includes a second through hole 121 corresponding to the first through hole 131 and is moveably coupled to the support plate 130, the first driver 140 for moving the first slider 120, and the iris unit 110 installed on the first slider 120 and for adjusting an amount of light that may pass through the iris unit 110.

The support plate 130, the first slider 120, and the iris unit 110 may be formed of a metal such as aluminum (Al) or stainless steel, or a synthetic resin.

The support plate 130 is fixed to a barrel 10 of the photographing apparatus, and functions as a supporting structure for the iris assembly 100.

The first slider 120 is coupled to the support plate 130 to linearly move along a first direction (here, an X-axis direction). More specifically, the first slider 120 is moveably coupled to the support plate 130 to slide on the support plate 130 by interposing a linear guide 150 extending along the first direction between the first slider 120 and the support plate 130.

The linear guide 150 includes a rail 151 extending along the first direction and disposed on the support plate 130, and first and second sliding blocks 152 and 153 installed on the first slider 120 and moveably coupled to the rail 151 to slide along the rail 151. The first sliding block 152 includes a hole 152a into which the rail 151 is inserted, and the second sliding block 153 includes an open groove 153a for supporting the rail 151 so that the second sliding block 153 may slide along the rail 151.

The rail 151 is coupled to a stopper 135 installed on the support plate 130. The sliding blocks 152 and 153 linearly move along the rail 151, but movement of the sliding blocks 152 and 153 along the first direction is restricted by the stopper 135.

In FIGS. 2 through 4, the stopper 135 and the rail 151 are installed on the support plate 130, and the sliding blocks 152 and 153 are installed on the first slider 120, but the present embodiment is not limited to the structure of the linear guide 150. That is, the rail 151 and the stopper 135 may be installed on the first slider 120, and the sliding blocks 152 and 153 may be installed on the support plate 130.

The iris unit 110 is fixed to the first slider 120 by bolts 117 that are coupled to grooves 127 through coupling holes 119, respectively. When the first slider 120 is couple to the support plate 130 while the iris unit 110 is coupled to the first slider 120, the iris unit 110 and the first slider 120 move relative to the support plate 130.

A detector 160 for detecting a change in a relative position of the first slider 120 with respect to the support plate 130 is installed between the support plate 130 and the first slider 120. The detector 160 includes reflective plates 162 that are attached to a supporter 138 of the support plate 130 to be spaced apart from each other in the first direction, and a photo sensor 161 for detecting light reflected by the reflective plates 162. The photo sensor 161 is installed on the first slider 120.

The first driver 140 is embodied by an ultrasonic motor including an ultrasonic wave generator 141a for generating ultrasonic vibrations, a tube 141b for transmitting the ultrasonic vibrations of the ultrasonic wave generator 141a, an elastic plate 142 that contacts an external surface of the tube 141b and moves along the tube 141b due to the ultrasonic vibrations by way of friction, a circuit board 141c, and a bracket 144 fixed to the first slider 120 and for supporting the elastic plate 142. The first driver 140 may convert the ultrasonic vibrations into linear movement of the first slider 120. The ultrasonic wave generator 141a of the first driver 140 is mounted on a mounting groove 135b of the stopper 135 of the support plate 130, and the tube 141b is coupled to a supporting groove 135c of the stopper 135.

The iris unit 110 include a third through hole 111 through which light may pass, an iris 113 that moves towards the third through hole 111 to change an area of the third through hole 111, and a driver 115 for driving the iris 113. For example, the driver 115 may be a stepping motor. The driver 115 of the iris unit 110 is electrically connected to a flexible circuit board 118 to be controlled by the iris driver 13 of FIG. 1.

The iris assembly 100 having the above-described structure may move in a direction (i.e., a direction indicated by an arrow B or C) crossing the optical axis L, as illustrated in FIG. 1 (here, a direction indicated by an arrow B). When the center of the iris unit 110 matches the optical axis L, if the photographing controller 47 operates the imaging device 20, the 2D photographing mode for obtaining a 2D image is executed.

When the 3D photographing mode for obtaining a 3D image is executed, a first image is obtained by moving the iris unit 110 to a first position in the direction indicted by the arrow B crossing the optical axis L and then performing a photographing operation, and then a second image is obtained by moving the iris unit 110 to a second position in the direction indicated by the arrow C crossing the optical axis L and then performing a photographing operation. In this case, the directions indicated by the arrows B and C are directions in which the first slider 120 linearly moves along the X-axis.

Figure 5:
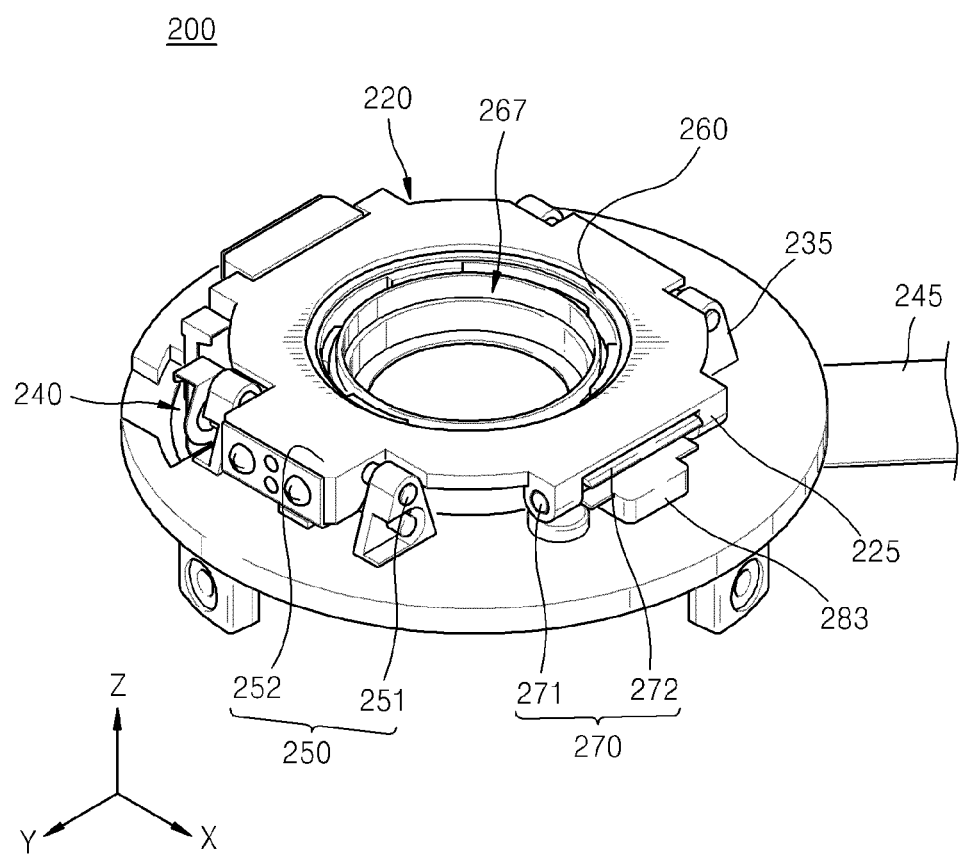
FIG. 5 is a perspective view of an iris assembly as a light amount adjusting device according to an embodiment of the invention.
Figure 6:
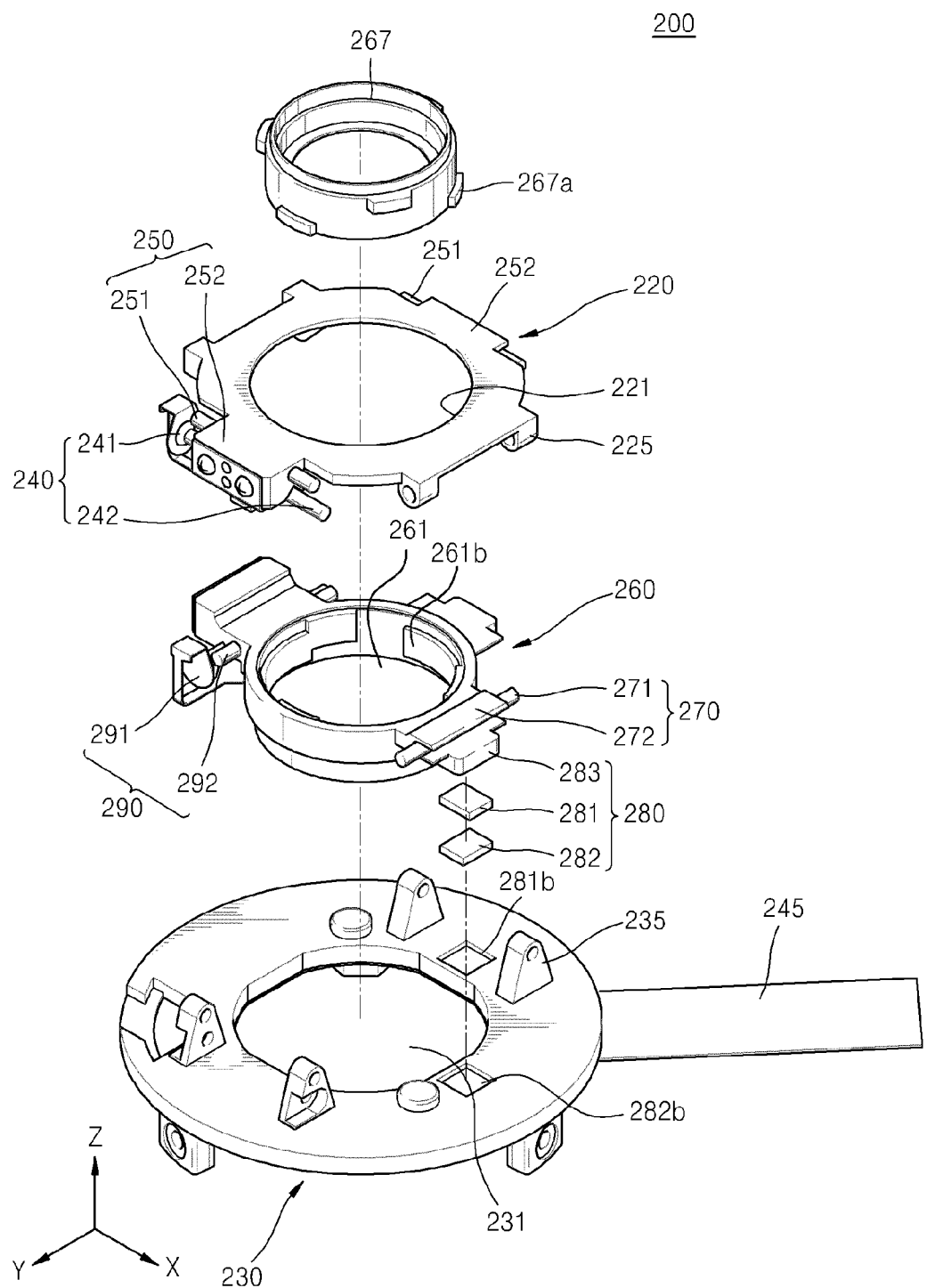
FIG. 6 is an exploded view of components of the light amount adjusting device of FIG. 5.

FIG. 5 is a perspective view of an iris assembly 200 as a light amount adjusting device according to an embodiment of the invention. FIG. 6 is an exploded view of components of the light amount adjusting device of FIG. 5.

In the light amount adjusting device of FIG. 2, the light amount adjuster thereof moves in the first direction (i.e., the X-axis direction) only. However, in the light amount adjusting device of FIGS. 5 and 6, a light amount adjuster may move in a second direction (here, a Y-axis direction) crossing the first direction.

Referring to FIGS. 5 and 6, the iris assembly 200 includes a support plate 230 including a first through hole 231 through which light may pass, a first slider 220 that includes a second through hole 221 corresponding to the first through hole 231 and linearly moves on the support plate 230 along the first direction (i.e., the X-axis direction), a first driver 240 for moving the first slider 220, a second slider 260 that includes a third through hole 261 corresponding to the second through hole 221 and is coupled to the first slider 220 to linearly move along the second direction (i.e., the Y-axis direction), and a second driver 290 for generating a driving force for moving the second slider 260.

A linear guide 250 is interposed between the first slider 220 and the support plate 230, and the first slider 220 is coupled to the support plate 230 to slide on the support plate 230. The linear guide 250 includes a rail 251 coupled to a stopper 235 of the support plate 230, and a sliding block 252 that is formed on the first slider 220 and is coupled to the rail 251 to slide along the rail 251. The sliding block 252 moves along the rail 251, and movement of the sliding block 252 is restricted by the stopper 235. Thus, linear movement of the first slider 220 on the support plate 230 is restricted by the stopper 235.

The first driver 240 for moving the first slider 220 on the support plate 230 is embodied by an ultrasonic motor including an ultrasonic wave generator 241, a tube 242, and the like, similarly to the ultrasonic motor illustrated in FIGS. 2 through 4, and thus descriptions of components of the first driver 240 and operations thereof will be omitted.

A linear guide 270 is interposed between the second slider 260 and the first slider 220, and the second slider 260 is coupled to the first slider 220 to slide on the first slider 220. The linear guide 270 includes a rail 271 coupled to a stopper 225 of the first slider 220, and a sliding block 272 formed on the second slider 260. Since the second slider 260 may slide along the rail 271, movement of the second slider 260 is restricted by the stopper 225 of the first slider 220.

The second driver 290 for generating a driving force for moving the second slider 260 also includes an ultrasonic wave generator 291 for generating ultrasonic vibrations, and a tube 292 for guiding sliding movement of the second slider 260 and for converting the ultrasonic vibrations into linear movement of the second slider 260. The second driver 290 also includes the same configuration as the ultrasonic motor described with reference to FIGS. 2 through 4, and thus descriptions of components of the second driver 290 and operations thereof will be omitted.

An iris unit supporter 267 is installed in the third through hole 261 of the second slider 260. Since mounting ribs 267a corresponding to inner mounting grooves 261b of the third through hole 261 are installed on an outer surface of the iris unit supporter 267, the iris unit supporter 267 may be conveniently mounted in the second slider 260. The iris unit supporter 267 supports a light amount adjuster similar to that shown in FIGS. 2 through 4. Although not illustrated in FIG. 6, the light amount adjuster including an iris for adjusting an amount of light that may pass therethrough in response to an external signal may be coupled to the iris unit supporter 267.

Sensor mounting grooves 281b and 282b are installed on an upper surface of the support plate 230. A first sensor 281 and a second sensor 282 are mounted on the sensor mounting grooves 281b and 282b, respectively. The first sensor 281 and the second sensor 282 are examples of a detector, and may be embodied by, for example, a photo sensor or a contact type sensor. The first sensor 281 detects a relative position of the first slider 220 with respect to the support plate 230, and detects a relative position of the second slider 260 with respect to the first slider 220.

A flexible circuit board 245 is installed on the support plate 230, and transmits electrical signals generated by the first driver 240, the second driver 290, the first sensor 281, the second sensor 282, and the like.

In the iris assembly 200 having the above-described structure, when the first slider 220 moves on the support plate 230, an iris unit (not shown) may linearly move along the first direction (i.e., the X-axis direction). In addition, when the second slider 260 moves on the first slider 220, the iris unit may linearly move along the second direction (i.e., the Y-axis direction).

Figure 7:
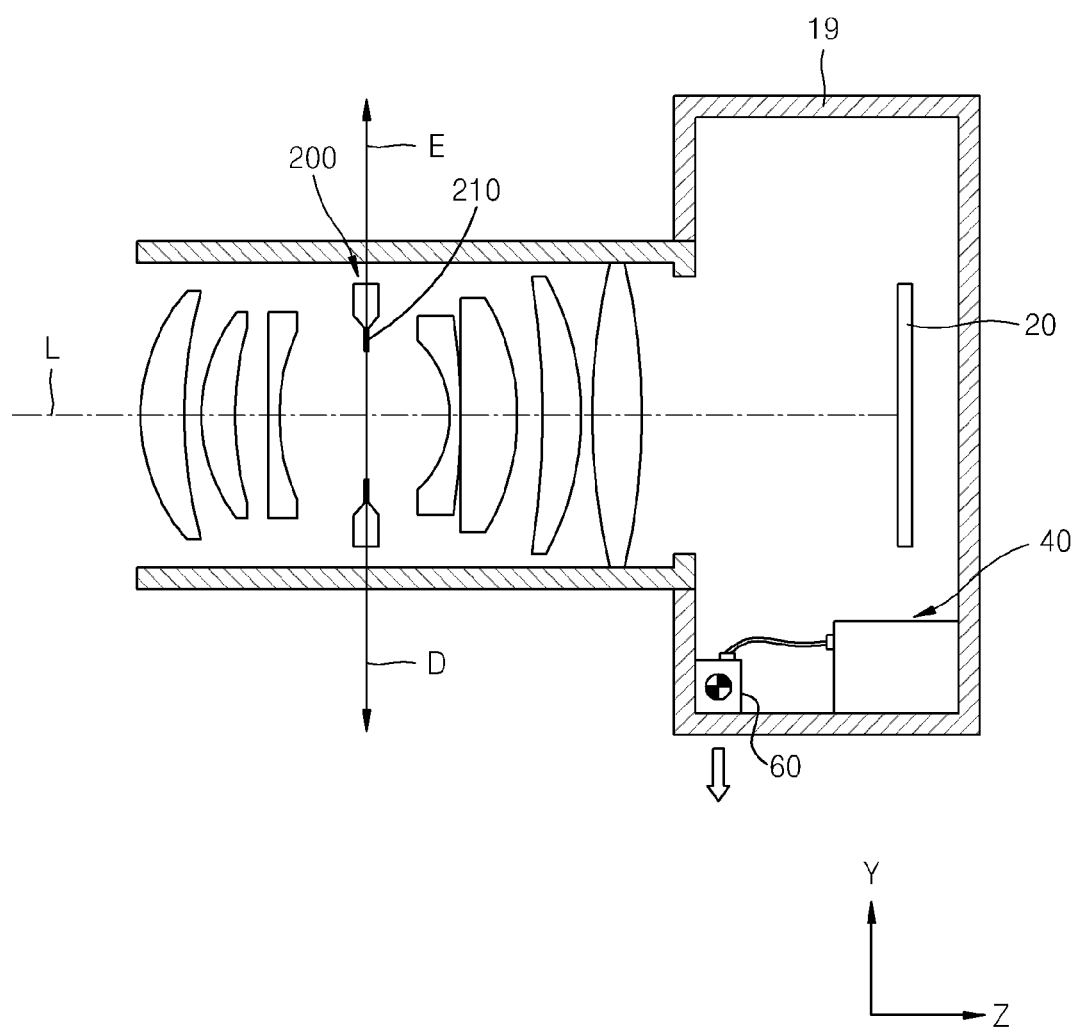
FIG. 7 is a lateral cross-sectional view of some components of a photographing apparatus including the light amount adjusting device of FIG. 5, according to an embodiment of the invention.

FIG. 7 is a lateral cross-sectional view of some components of a photographing apparatus including the light amount adjusting device of FIG. 5, according to an embodiment of the invention.

The imaging device 20, the gravity sensor 60, and the controller 40 are installed in the body 19 of the photographing apparatus. The gravity sensor 60 may detect a direction of gravity to detect a rotational position of the body 19 relative to the ground. The controller 40 may determine a direction in which an iris unit 210 of the iris assembly 200 moves based on the detected rotational position of the body 19 in order to execute the 3D photographing mode.

In order to perform photographing operations when the body 19 is positioned in parallel to the ground ('horizontal photographing') or when the body 19 is positioned crossing the ground ('vertical photographing'), the iris unit 210 may move along the Y-axis direction crossing the optical axis L or may move along the X-axis direction crossing the ground of FIG. 7.

For example, in the 3D photographing mode, when the iris unit 210 moves in the Y-axis direction, a first image is obtained by moving the iris unit 210 to a first position in a direction indicated by an arrow D and then performing a photographing operation, and then a second image is obtained by moving the iris unit 210 to a second position in a direction indicated by an arrow E and then performing a photographing operation.

Figure 8:
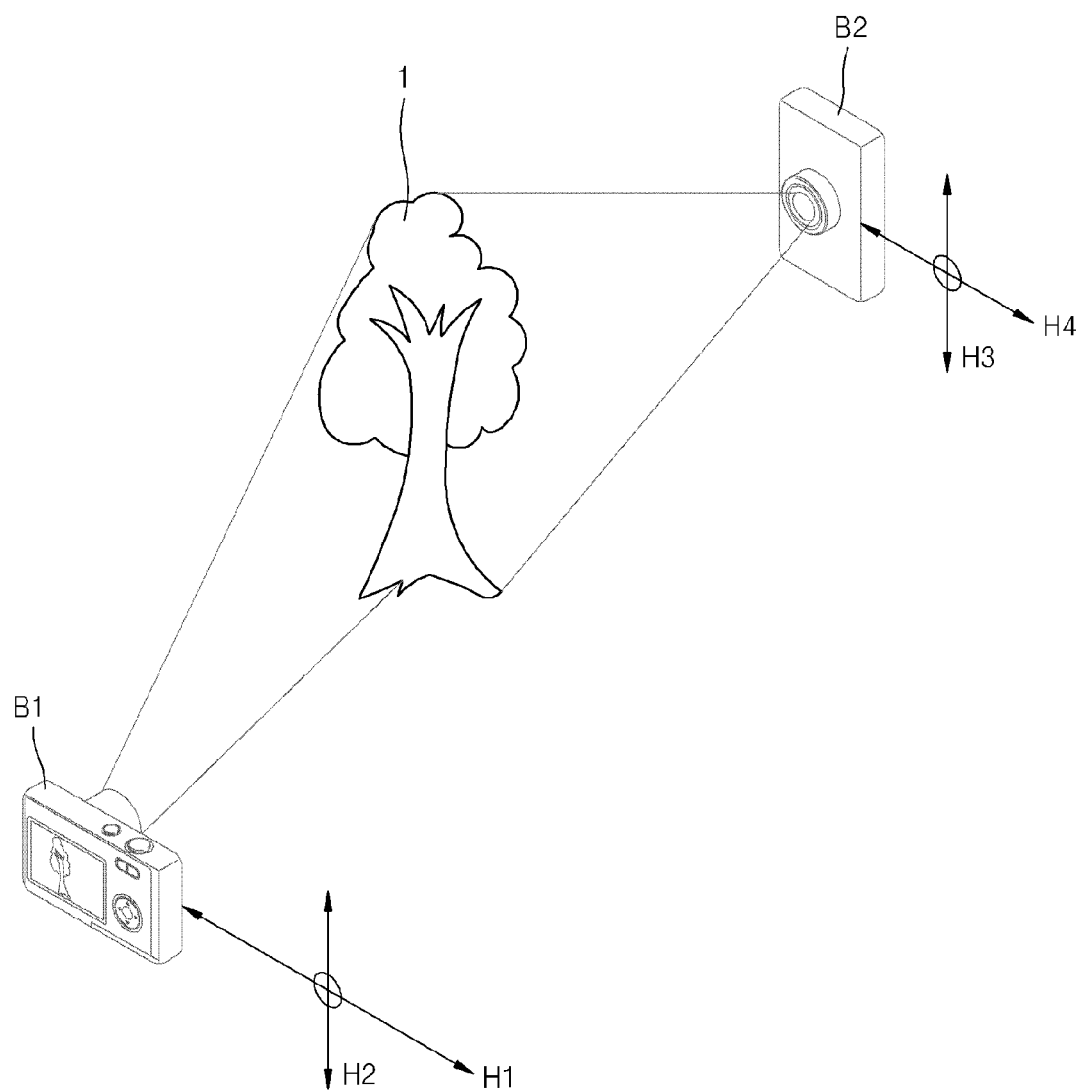
FIG. 8 is a conceptual view of a photographing operation using the photographing apparatus of FIG. 7, according to an embodiment of the invention.

FIG. 8 is a conceptual view of a photographing operation using the photographing apparatus of FIG. 7, according to an embodiment of the invention.

The iris assembly 200 of FIGS. 5 and 6, the iris unit 210 may select any one of the X-axis direction and the Y-axis direction, and may move in the selected direction. In addition, as illustrated in FIG. 7, when the photographing apparatus includes the gravity sensor 60, since the gravity sensor 60 may detect a moving direction of the body 19, a moving direction of the iris unit 210 in the 3D photographing mode may be determined based on the detected moving direction of the body 19.

For example, in FIG. 8, in order to photograph a subject 1 illustrated as a tree, when the 3D photographing mode is executed in a photographing apparatus B1 positioned in parallel to a horizontal direction H1 crossing a gravity direction H2, the iris unit 210 moves left and right along the horizontal direction H1 in FIG. 8 to obtain a first image and a second image to obtain a 3d image. The first image and the second image obtained by the photographing apparatus B1 positioned in parallel to the horizontal direction H1 have different angles with respect to left and right directions to match two eyes of a viewer viewing an obtained 3D image, and thus the obtained 3D image may be realistic.

In addition, in order to photograph the subject 1, when the 3D photographing mode is executed in a photographing apparatus B2 positioned in parallel to a gravity direction H3, the iris unit 210 moves left and right along a vertical direction H4 crossing the gravity direction H3 in FIG. 8 to obtain a first image and a second image.

When the 3D photographing mode is executed in the photographing apparatus B2 positioned in parallel to the gravity direction H3, if the first image and the second image may be obtained by moving the iris unit 210 along the gravity direction H3 without considering a rotation of the photographing apparatus B2, the first image and the second image have different angles with respect to upper and lower directions of a viewer. Thus, an image realized by using the first image and the second image is recognized by the viewer as an awkward image with mismatched focal points, but not as a 3D image.

Thus, when the 3D photographing mode is executed in the photographing apparatus B2 positioned in parallel to the gravity direction H3, the iris unit 210 moves left and right along the vertical direction H4 crossing the gravity direction H3 to obtain the first image and the second image to obtain a 3d image. In this case, since the first image and the second image have different angles with respect to left and right directions to match two eyes of a viewer viewing the obtained 3D image, and thus the obtained 3D image may be realistic.

Figure 9:
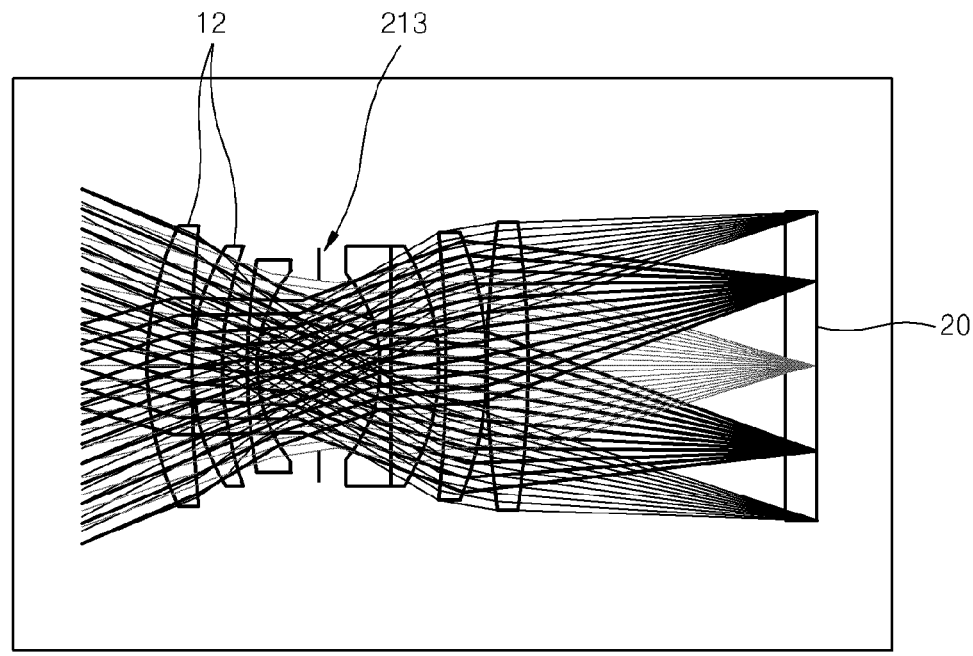
FIG. 9 is a conceptual view for explaining an optical path during a two-dimensional (2D) photographing operation of the photographing apparatus of FIG. 7, according to an embodiment of the invention.
Figure 10:
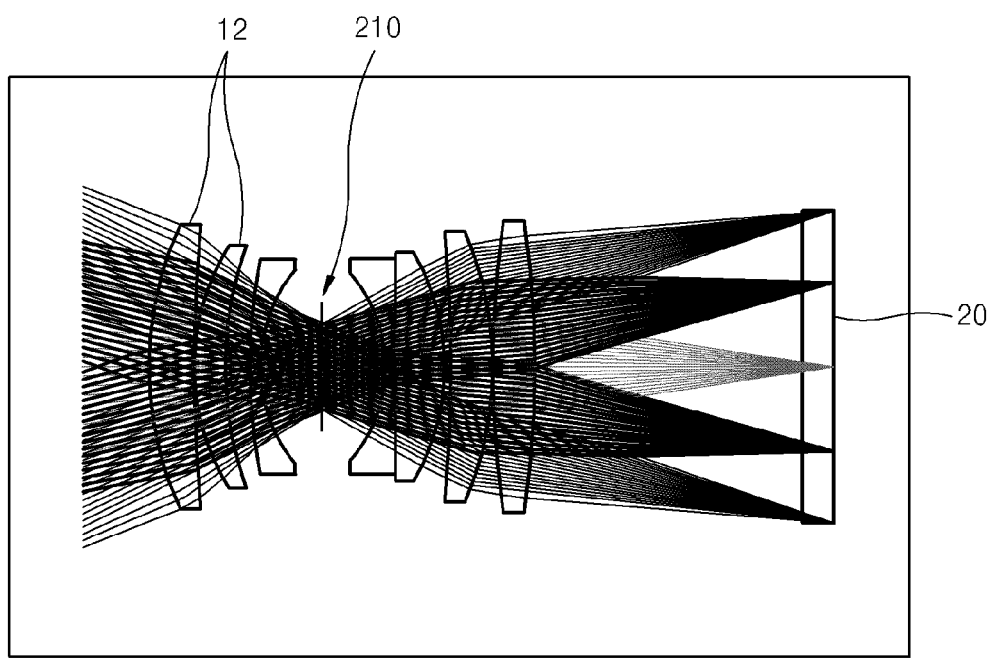
FIG. 10 is a conceptual view for explaining an optical path during a 2D photographing operation of the photographing apparatus of FIG. 7, according to another embodiment of the invention.

FIG. 9 is a conceptual view for explaining an optical path during a 2D photographing operation of the photographing apparatus of FIG. 7, according to an embodiment of the invention. FIG. 10 is a conceptual view for explaining an optical path during a 2D photographing operation of the photographing apparatus of FIG. 7, according to another embodiment of the invention.

In FIG. 9, the iris unit 210 is in a state where an iris thereof is fully widened to ensure a sufficient amount of light. In FIG. 10, the iris unit 210 is in a state where the iris is narrowed to receive a reduced amount of light. Photographing modes of FIGS. 9 and 10 may each correspond to the 2D photographing mode for obtaining a 2D image since the centers of the lenses 12, that is, an optical axis, matches a center of the iris unit 210. When light passing through the lenses 12 is incident on the imaging device 20 through the iris unit 210, a 2D image is obtained.

Figure 11:
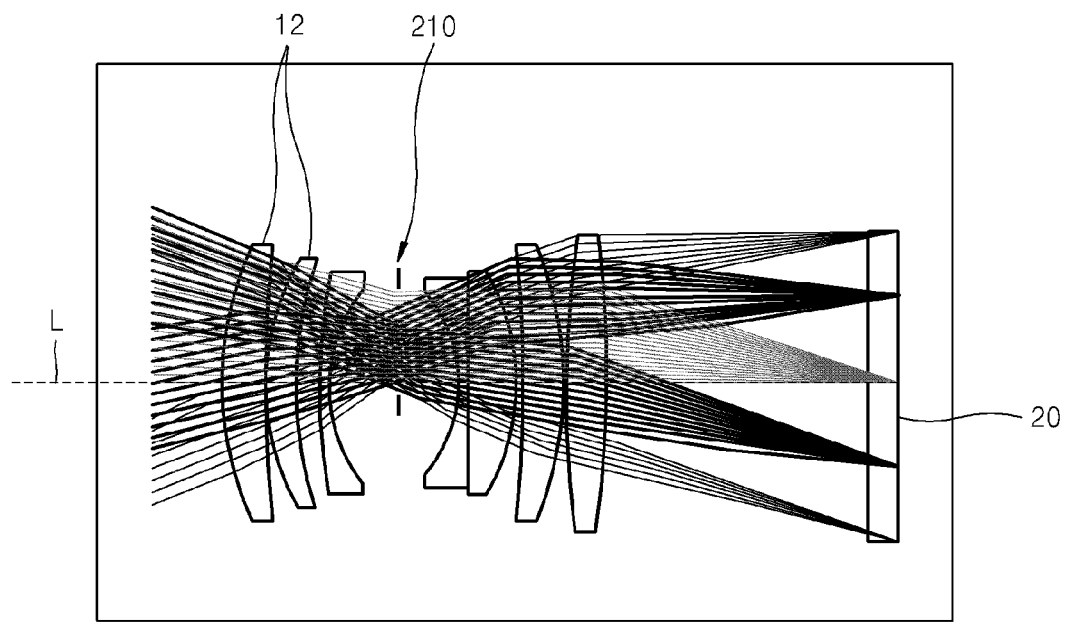
FIG. 11 is a conceptual view of an optical path corresponding to a first position of a light amount adjuster during a three-dimensional (3D) photographing operation of the photographing apparatus of FIG. 7, according to an embodiment of the invention.
Figure 12:
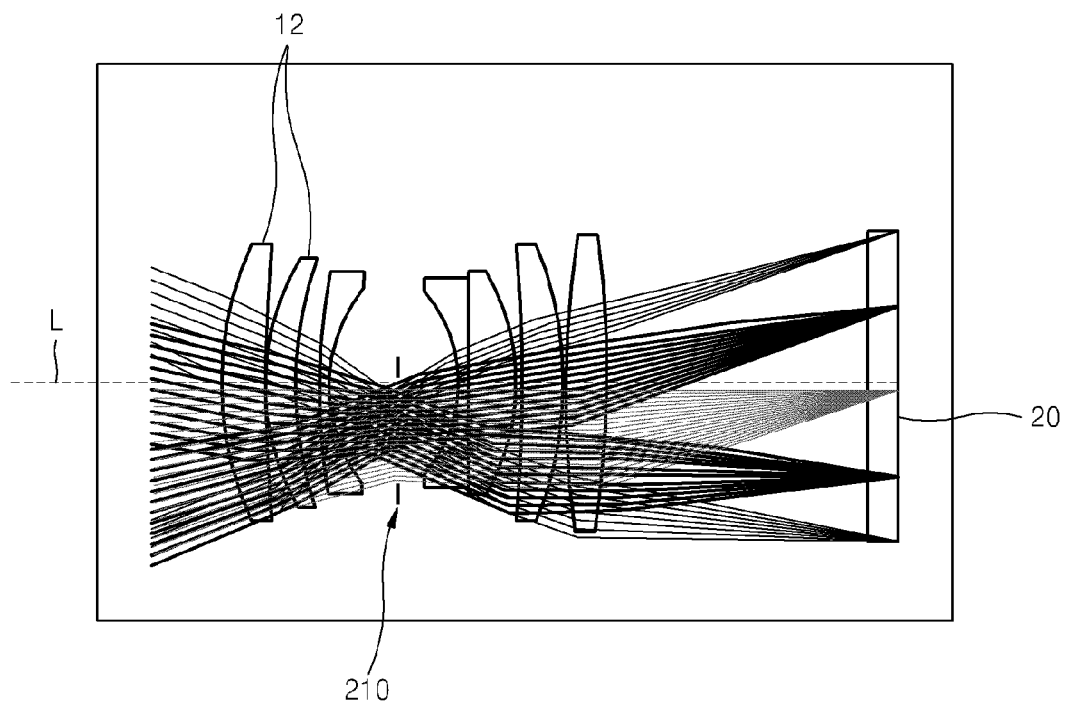
FIG. 12 is a conceptual view of an optical path corresponding to a second position of a light amount adjuster during a 3D photographing operation of the photographing apparatus of FIG. 7, according to an embodiment of the invention.

FIG. 11 is a conceptual view of an optical path corresponding to the first position of the light amount adjuster during a 3D photographing operation of the photographing apparatus of FIG. 7, according to an embodiment of the invention. FIG. 12 is a conceptual view of an optical path corresponding to the second position of the light amount adjuster during a 3D photographing operation of the photographing apparatus of FIG. 7, according to an embodiment of the invention.

In the 3D photographing mode, the first image is captured when the iris unit 210 is moved along the first direction crossing the optical axis L and corresponding to centers of the imaging device 20 and the lenses 12 to the first position, as illustrated in FIG. 11, and the second image is captured when the iris unit 210 is moved along the second direction crossing the optical axis L to the second position, as illustrated in FIG. 12. Thus, since the first image and the second image have different angles with respect to left and right directions to match two eyes of a viewer viewing a 3D image obtained using the first and second images, and thus the obtained 3D image may be realistic.

Figure 13:
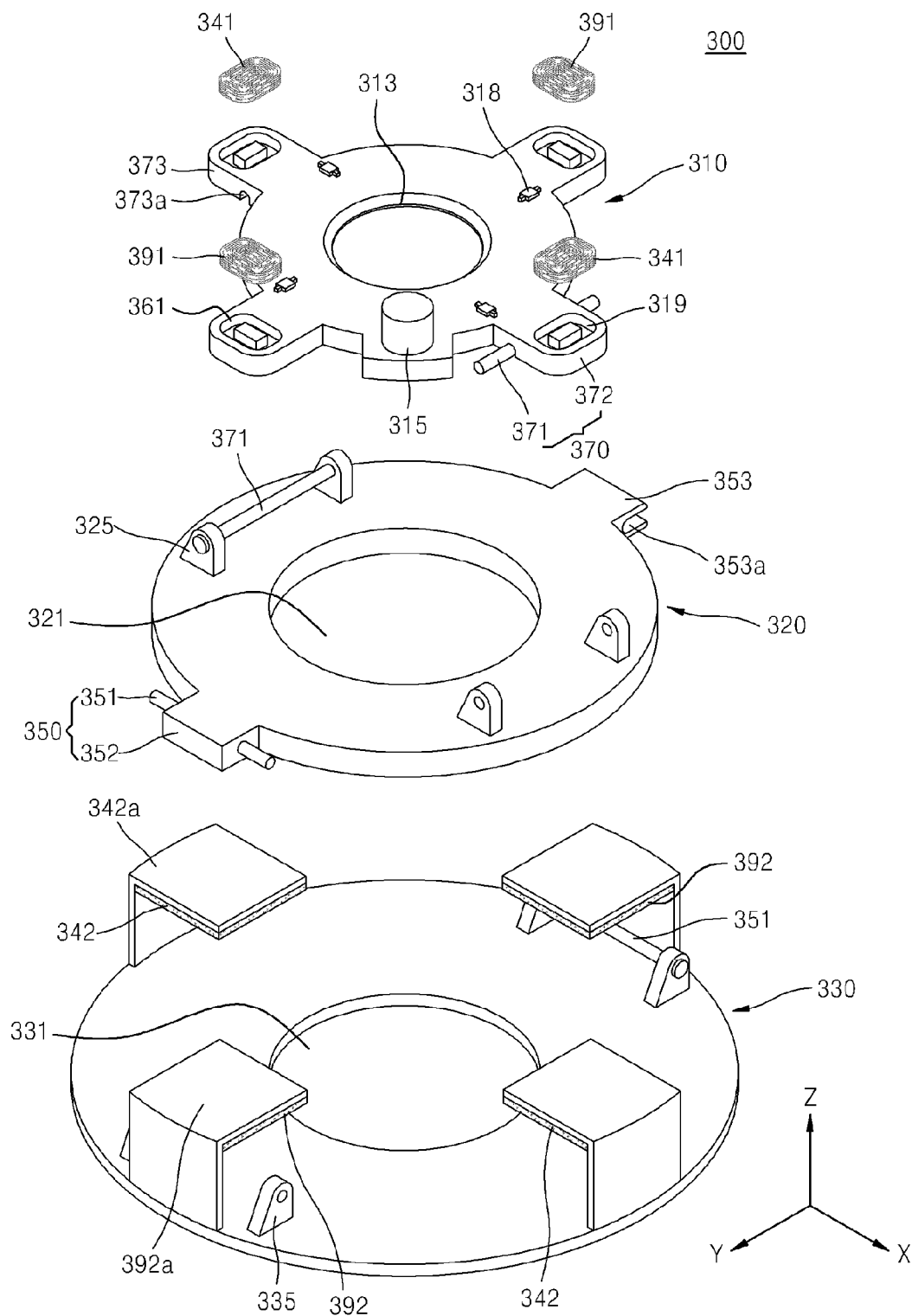
FIG. 13 is an exploded view of components of a light amount adjusting device according to another embodiment of the invention.

FIG. 13 is an exploded view of components of a light amount adjusting device according to another embodiment of the invention.

Figure 14:
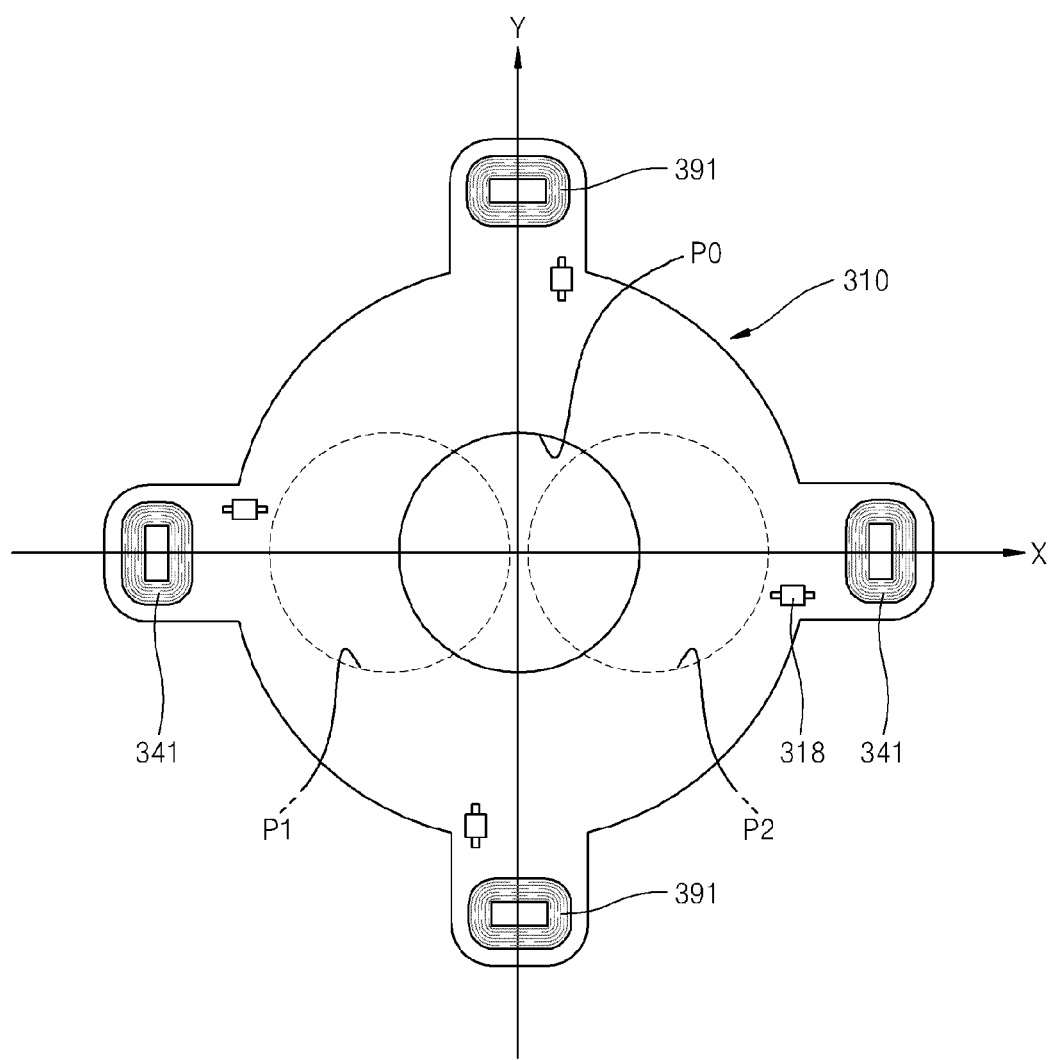
FIG. 14 is a plan view for explaining a first operational state of the light amount adjusting device of FIG. 13, according to an embodiment of the invention.

Referring to FIGS. 13 and 14, an iris assembly 300 includes a support plate 330 including a first through hole 331 through which light may pass, a first slider 320 coupled to the support plate 330 to linearly move along the first direction (i.e., the X-axis direction), first drivers 391 and 392 for generating a driving force for moving the first slider 320, and an iris unit 310 that adjusts a light amount and is coupled to the first slider 320 to move along the second direction (i.e., the Y-axis direction) crossing the first direction.

The first slider 320 includes a second through hole 321 corresponding to the first through hole 331, and is coupled to the support plate 330 to slide on the support plate 330 while interposing a linear guide 350 including a rail 351 and first and second sliding blocks 352 and 353 between the first slider 320 and the support plate 330. The second sliding block 353 includes an open groove 353a for convenient assembly. The support plate 330 includes a stopper 335 for restricting movement of the first sliding block 352 between both ends of the rail 351.

The iris unit 310 is moved by being driven by a driver 315 to adjust an amount of light that may pass through the first through hole 331 and the second through hole 321. The iris unit 310 is coupled to the first slider 320 to slide on the first slider 320 while interposing a linear guide 370 including a rail 371 and first and second sliding blocks 372 and 373 that are coupled to the rail 371 to slide on the rail 371 between the iris unit 310 and the first slider 320. An open groove 373a for convenient assembly with the rail 371 is formed on a bottom surface of the second sliding block 373. The first slider 320 includes a stopper 325 for restricting movement of the first and second sliding blocks 372 and 373 between both ends of the rail 371.

The first drivers include first coils 391 disposed on the iris unit 310, and first magnet portions 392 installed in brackets 392a of the support plate 330 to correspond to the first coils 391. A desired attractive or repulsive force may act between the first coils 391 and the first magnet portions 392 by controlling a current value supplied to the first coils 391. Thus, a force applied to the iris unit 310 is transferred to the first slider 320 so that the first slider 320 may move on the support plate 330.

Second drivers 341 and 342 include second coils 341 disposed on the iris unit 310, and second magnet portions 342 installed in brackets 342a of the support plate 330 to correspond to the second coils 341. Like with the first drivers 391 and 392, a desired attractive or repulsive force may act between the second magnet portions 342 and the second coils 341 by controlling a current value supplied to the second coils 341. Thus, the iris unit 310 may move on the first slider 320.

The iris unit 310 may include a detector 318 for detecting a relative position of the iris unit 310 with respect to the support plate 330. The detector 318 may use a hall sensor using a principle in which an induced current (or a voltage) varies according to an intensity of a magnetic field.

The first drivers 391 and 392 and the second drivers 341 and 342 are not limited to the above-described structures, and may have any of various forms. For example, the first coils 391 may be installed on the first slider 320, and the first slider 320 may be moved by a magnetic force acting between the first magnet portions 392 and the first coils 391. Alternatively, magnet portions may be disposed on the iris unit 310, and coils may be disposed on the support plate 330.

FIG. 14 is a plan view for explaining a first operational state of the light amount adjusting device of FIG. 13, according to an embodiment of the invention.

In the iris assembly 300 of FIG. 13, the iris unit 310 may selectively move in the first direction (i.e., the X-axis direction) or the second direction (i.e., the Y-axis direction). FIG. 14 shows the first operational state in which the iris unit 310 moves in the X-axis direction by supplying a current to the first coils 391. The first operational state may correspond to, for example, a horizontal photographing state in which a photographing apparatus is positioned in parallel to the ground. In this case, the Y-axis direction corresponds to a gravity direction. When the iris unit 310 is in an original position P0 in which a center of the iris unit 310 matches an optical axis, a 2D image may be obtained.

In the 3D photographing mode, a 3D image may be obtained by capturing a first image when the iris unit 310 is moved left along the X-axis direction to a first position P1, and by capturing a second image when the iris unit 310 is moved right along the X-axis direction to a second position P2.

Figure 15:
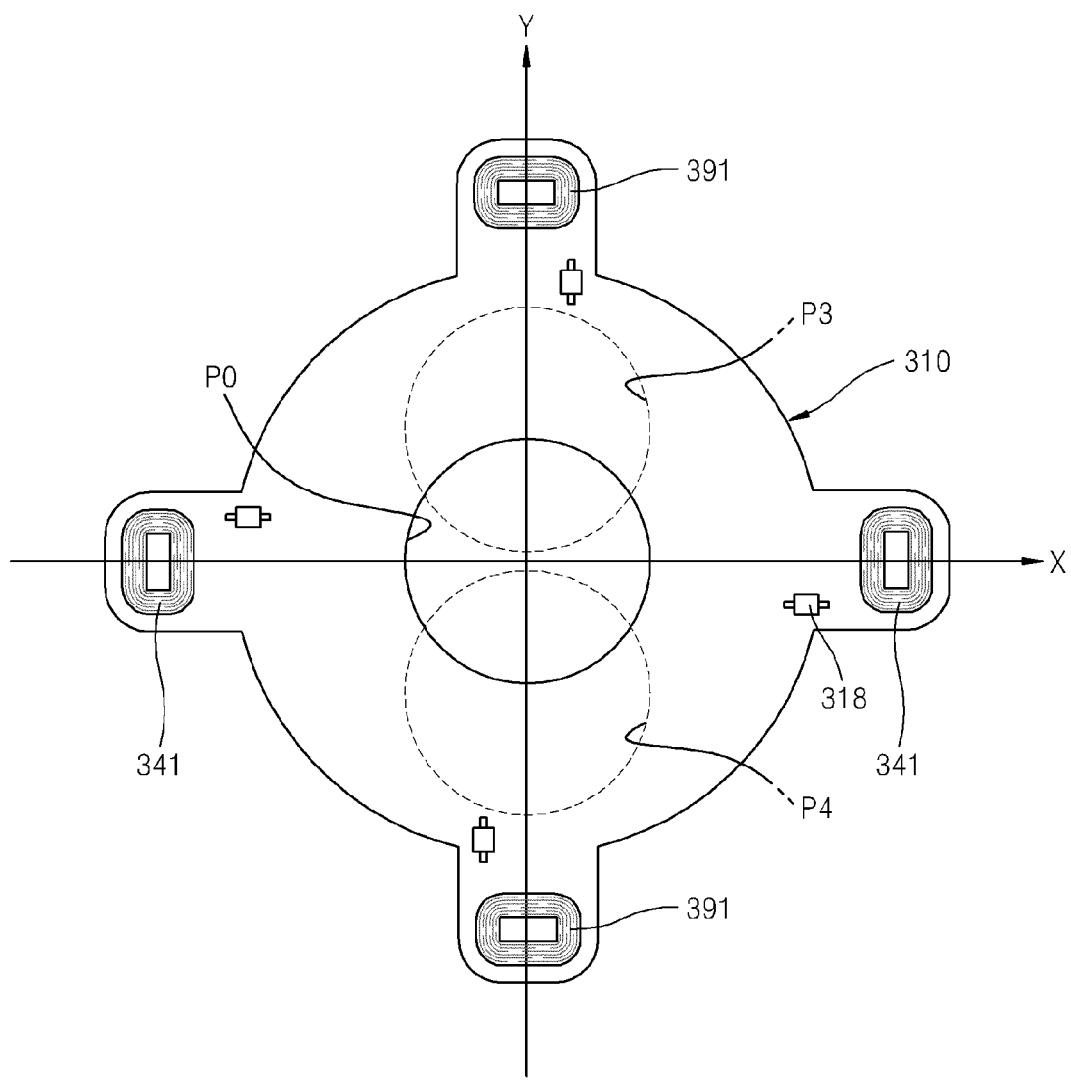
FIG. 15 is a plan view for explaining a second operational state of the light amount adjusting device of FIG. 13, according to an embodiment of the invention.

FIG. 15 is a plan view for explaining a second operational state of the light amount adjusting device of FIG. 13, according to an embodiment of the invention.

FIG. 15 shows the second operational state in which the iris unit 310 moves in the Y-axis direction by supplying a current to the second coils 341. The second operational state may correspond to, for example, a vertical photographing state in which a photographing apparatus is positioned perpendicular to the ground. In this case, the X-axis direction corresponds to the gravity direction. When the iris unit 310 is in an original position P0 in which the center of the iris unit 310 matches an optical axis, a 2D image may be obtained.

In the 3D photographing mode, a 3D image may be obtained by capturing a first image when the iris unit 310 is moved upwards along the Y-axis direction to a first position P3, and by capturing a second image when the iris unit 310 is moved downwards along the Y-axis direction to a second position P4.

Figure 16:
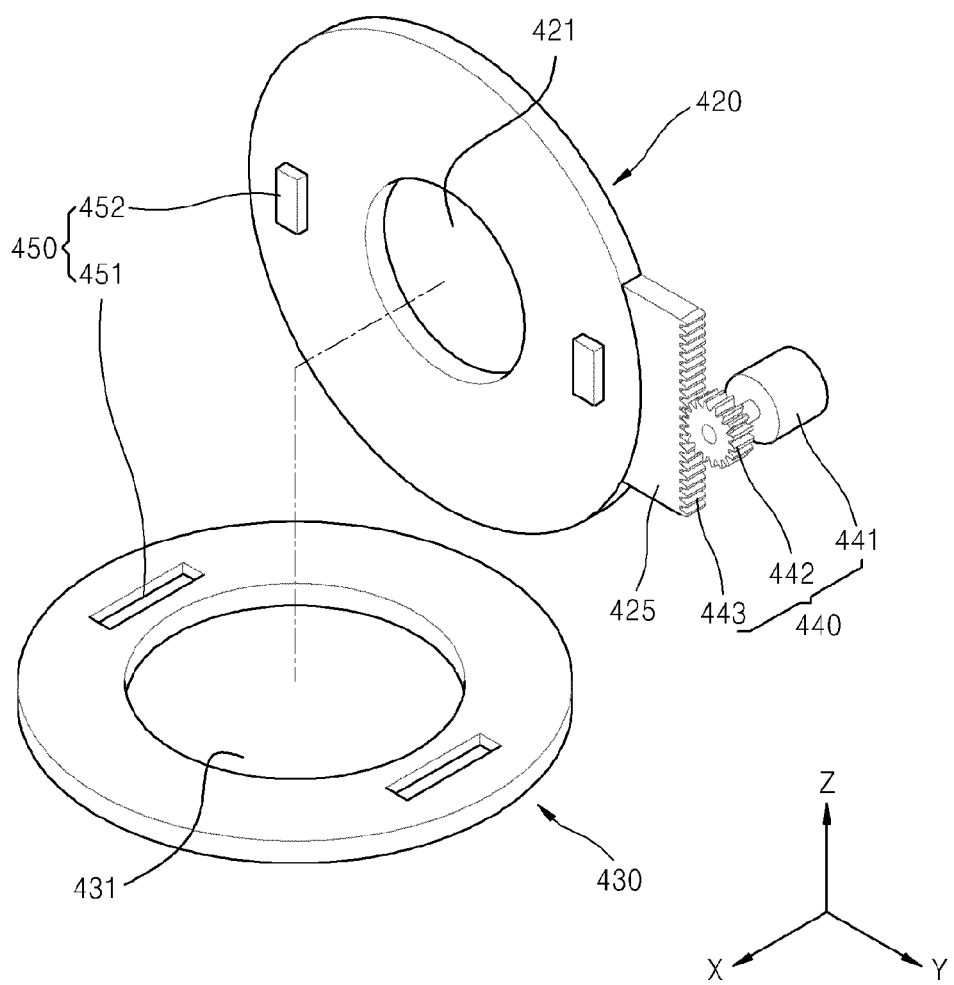
FIG. 16 is an exploded view of components of a light amount adjusting device according to another embodiment of the invention.

FIG. 16 is an exploded view of components of a light amount adjusting device according to another embodiment of the invention.

Referring to FIG. 16, an iris assembly 400 includes a support plate 430 including a first through hole 431 through which light may pass, a first slider 420 that includes a second through hole 421 corresponding to the first through hole 431 and is coupled to the support plate 430 to move along the first direction (i.e., the X-axis direction), an iris unit (not shown) coupled to the first slider 420, and a first driver 440 for generating a driving force for moving the first slider 420.

The first slider 420 may be coupled to the support plate 430 to slide on the support plate 430 while interposing a linear guide 450 between the first slider 420 and the support plate 430. The linear guide 450 includes a linear groove 451 formed in the support plate 430, and a sliding block 452 that is formed on the first slider 420 and is coupled to the linear groove 451 to slide. An arrangement and shapes of the linear groove 451 and the sliding block 452 may have any of various forms.

The first driver 440 includes a driving motor 441, a rotational gear 442 coupled to an axis of the driving motor 441, and a rack gear 443 formed on a driving block 425 coupled to an external surface of the first slider 420. Since the support plate 430 is fixed to a structure such a barrel (not shown), when a force generated by the driving motor 441 is transferred to the rack gear 443 through the rotational gear 442, the first slider 420 may move on the support plate 430.

Figure 17:
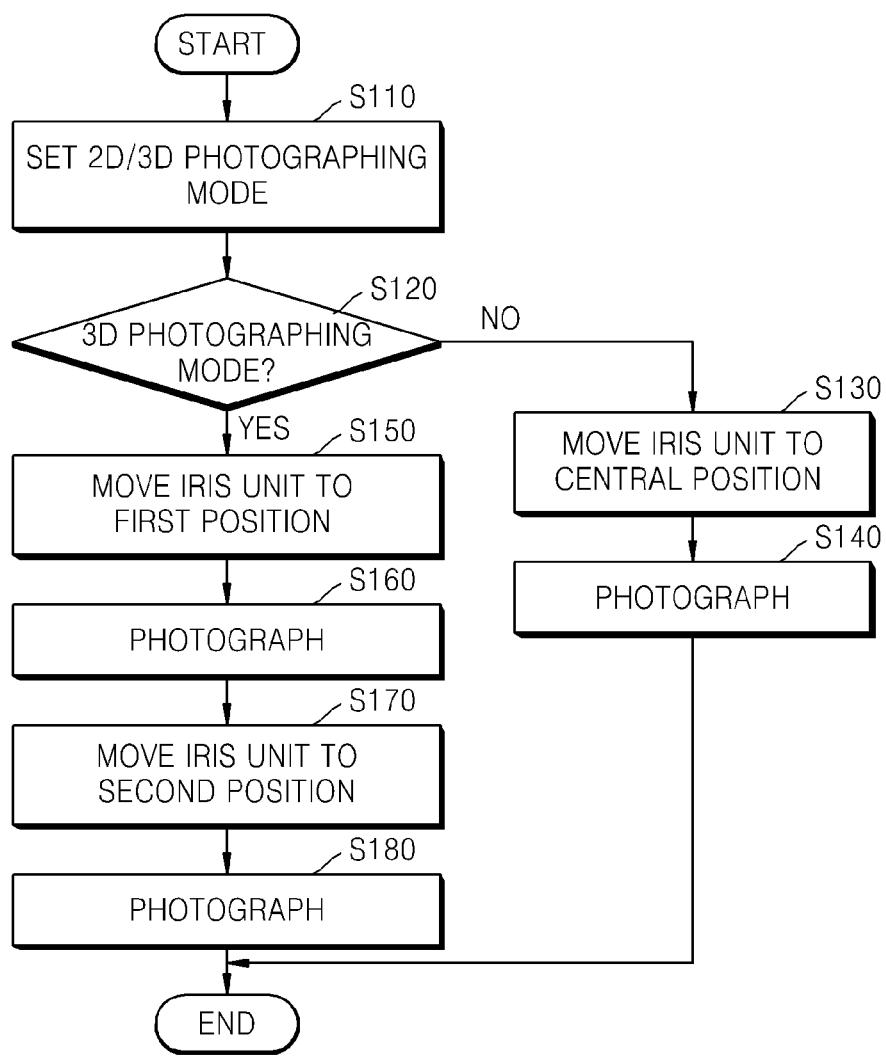
FIG. 17 is a flowchart of a photographing method according to an embodiment of the invention.

FIG. 17 is a flowchart of a photographing method according to an embodiment of the invention.

In the photographing method of FIG. 17, a 2D photographing mode or a 3D photographing mode may be selectively performed by a photographing apparatus. The photographing method includes linearly moving a light amount adjuster (e.g., an iris unit) along at least one direction crossing an optical axis (S130, S150, and S170), and performing any one photographing operation (S140, S160, and S180) from among a 2D photographing mode in which a center of the light amount adjuster matches the optical axis according to a predetermined photographing mode (S140), and a 3D photographing mode in which the light amount adjuster moves in a first direction to a first position or a second direction to a second position in which the center of the light amount adjuster is offset from the optical axis, and a first image and a second image are obtained in the first position and the second position, respectively (S160, and S180).

In more detail, a photographing mode is set from among 2D/3D photographing modes (S110). When a shutter manipulation is performed for photographing, it is determined whether the photographing mode is set as the 3D photographing mode in operation S110 (S120).

When the photographing mode is set as the 2D photographing mode, the light amount adjuster moves to a central position corresponding to optical axes of lenses (S130), and then an image device is operated to perform a 2D photographing operation (S140). Prior to moving the light amount adjuster (S130), during the moving of the light amount adjuster to the central position, or after the moving of the light amount adjuster to the central position, an amount of light that may pass may be adjusted by controlling the light amount adjuster. Here, the adjusting of the amount of light is determined according to brightness of a subject to be photographed.

When the photographing mode is set as the 3D photographing mode, the light amount adjuster moves to the first position in which the light amount adjuster is offset from the optical axis towards one side (S150), and the first image is captured by the imaging device (S160). Then, the light amount adjuster moves to the second position in which the light amount adjuster is offset from the optical axis towards the other side (S170), and then the second image is captured by the imaging device (S180). Likewise, a 3D image may be realized by using the first image and the second image obtained in the first position and the second position in which the light amount adjuster is offset from the optical axis.

Also in the 3D photographing mode, prior to, during, or after moving the light amount adjuster to the first position and the second position, an amount of light that may pass therethrough may be adjusted by controlling the light amount adjuster.

In addition, the first position and the second position are positioned on a straight line extending towards one direction that may be changed according to a rotational direction of the imaging device. To this end, the photographing method may further include detecting the rotational direction of the image device. The rotational direction of the image device may be detected by a gravity sensor for detecting a direction of gravity, an accelerometer, a gyro sensor, or the like.

When the imaging device is positioned perpendicular to a gravity direction (i.e., in parallel to the ground), if the 3D photographing mode is executed, the straight line connecting the first position and the second position to each other extends along a direction positioned in parallel to the ground (i.e., a horizontal direction of the imaging device).

In addition, when the imaging device is positioned in parallel to the gravity direction (i.e., perpendicular to the ground), if the 3D photographing mode is executed, the straight line connecting the first position and the second position to each other extends along a direction positioned perpendicular to the ground (i.e., a perpendicular direction of the imaging device).

Likewise, by changing the extending direction of the straight line connecting the first position and the second position in which the 3D photographing mode is executed, a 3D image may be obtained to provide a realistic 3D effect to a viewer's two eyes.

As described above, in a photographing apparatus and method according to the one or more embodiments of the invention, a simple and compact light amount adjusting device is used, and thus 2D photographing or 3D photographing may be conveniently selected and performed. In addition, when a 3D image is captured, a moving direction of a light amount adjuster is changed based on a rotational direction of a photographing apparatus, and thus a 3D image may be obtained to provide a realistic 3D effect to a viewer's two eyes.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional embodiments may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional embodiments of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A light amount adjusting device comprising:
   a support plate comprising a first through hole through which light passes;
   a first slider that comprises a second through hole corresponding to the first through hole, and linearly moves with respect to the support plate along a first direction;
   a first driver for generating a driving force for moving the first slider with respect to the support plate; and
   an iris unit installed on the first slider and for adjusting an amount of light passing through the iris unit.

2. The light amount adjusting device of claim 1, further comprising a stopper that is installed on any one of the first slider and the support plate in order to restrict movement of the first slider in the first direction.

3. The light amount adjusting device of claim 1, wherein the first slider is coupled to the support plate to slide with respect to the support plate through a linear guide extending in the first direction interposed between the first slider and the support plate.

4. The light amount adjusting device of claim 3, wherein the linear guide comprises a rail disposed on one of the support plate and the first slider to extend in the first direction, and a sliding block disposed on the other one of the support plate and the first slider to slide along the rail.

5. The light amount adjusting device of claim 1, further comprising a detector for detecting a relative position of the first slider with respect to the support plate.

6. The light amount adjusting device of claim 1, wherein the first driver comprises an ultrasonic motor for converting ultrasonic vibrations into linear movement of the first slider.

7. The light amount adjusting device of claim 1, wherein the first driver comprises a first coil disposed on one of the support plate and the first slider, and a first magnet portion disposed on the other one of the support plate and the first slider to correspond to the first coil.

8. The light amount adjusting device of claim 1, wherein a second slider is interposed between the iris unit and the first slider so that the iris unit linearly moves along a second direction crossing the first direction, and
   wherein the iris unit further comprises a second driver for generating a driving force for moving the second slider.

9. The light amount adjusting device of claim 8, further comprising a stopper installed on any one of the first slider and the second slider to restrict movement of the second slider in the second direction.

10. The light amount adjusting device of claim 8, wherein the second slider is coupled to the first slider through a linear guide comprising a rail that is disposed on one of the first slider and the second slider to extend in the second direction, and a sliding block disposed on the other one of the first slider and the second slider to slide along the rail.

11. The light amount adjusting device of claim 8, further comprising a detector for detecting a relative position of the second slider with respect to the first slider.

12. The light amount adjusting device of claim 8, wherein the second driver comprises an ultrasonic motor for converting ultrasonic vibrations into linear movement of the second slider.

13. The light amount adjusting device of claim 1, wherein the iris unit is coupled to the first slider to linearly move in a second direction crossing the first direction,
- wherein the first driver comprises a first coil disposed on one of the support plate and the iris unit, and a first magnet portion that is disposed on the other one of the support plate and the iris unit to correspond to the first coil, and
- wherein the light amount adjusting device further comprises a second driver comprising a second coil that is disposed on one of the support plate and the iris unit, and a second magnet portion disposed on the other one of the support plate and the iris unit, and generates a driving force for moving the light adjuster to the second direction with respect to the first slider.

14. A photographing apparatus comprising:
- a plurality of lenses disposed along an optical axis passing light from images to an imaging device;
- a light amount adjuster disposed at a predetermined position between the plurality of lenses to linearly move along at least one direction crossing the optical axis and for adjusting an amount of light passing through the light amount adjuster;
- an imaging device for converting light passed by the plurality of lenses and the light amount adjuster into an electrical signal;
- a first driver for generating a driving force for moving the light amount adjuster along the at least one direction; and
- a controller for controlling the imaging device and the first driver to perform a photographing operation, and for selecting and performing any one of a two-dimensional (2D) photographing mode by moving the light amount adjuster to a central position that matches the optical axis and adjusting the amount of light passing through the light amount adjuster, and a three-dimensional (3D) photographing mode in which a first image is captured by moving the light amount adjuster to a first position in which the light amount adjuster is offset from the optical axis towards one side, the amount of light passing through the light amount adjuster is adjusted, and a first image is obtained, and a second image is captured at a different angle than the first image by moving the light amount adjuster to a second position in which the light amount adjuster is offset from the optical axis towards the other side, the amount of light passing through the light amount adjuster is adjusted, and the second image is obtained.

15. The photographing apparatus of claim 14, further comprising:
- a support plate comprising a first through hole through which light passes; and
- a first slider that comprises a second through hole corresponding to the first through hole, supports the light amount adjuster, and is coupled to the support plate to linearly move along a first direction,
- wherein the first driver linearly moves the first slider with respect to the support plate.

16. The photographing apparatus of claim 15, wherein the light amount adjuster is coupled to the first slider to linearly move in a second direction crossing the first direction through a second slider, and
- wherein the light amount adjuster further comprises a second driver for generating a driving force for moving the second slider.

17. The photographing apparatus of claim 16, further comprising a direction detector for detecting a rotational direction of the photographing apparatus,
- wherein, during the 3D photographing mode, when the direction detector recognizes that the photographing apparatus is positioned in parallel to the ground, the controller controls the first driver to move the first slider, and when the direction detector recognizes that the photographing apparatus is positioned perpendicular to the ground, the controller controls the second driver to move the second slider.

18. The photographing apparatus of claim 14, wherein the first slider is coupled to the support plate to slide on the support plate through a linear guide extending in the first direction.

19. The photographing apparatus of claim 18, further comprising a stopper that is installed on any one of the first slider and the support plate in order to restrict movement of the first slider.

20. A photographing method using a plurality of lenses disposed along an optical axis; a light amount adjuster disposed at a predetermined position between the plurality of lenses and for adjusting an amount of light, and an imaging device for converting light passing through the plurality of lenses and the light amount adjuster into an electrical signal, the photographing method comprising:
- linearly moving the light amount adjuster along at least one direction crossing the optical axis; and
- selecting and performing one of a two-dimensional (2D) photographing mode in which the light amount adjusting and photographing operation is performed when the light amount adjuster moves to a central position that matches the optical axis, and a three-dimensional (3D) photographing mode in which a first image is captured by moving the light amount adjuster to a first position and adjusting the light amount, where the light amount adjuster is offset from the optical axis towards one side, and a second image is captured by moving the light amount adjuster to a second position and adjusting the light amount, where the light amount adjuster is offset from the optical axis towards the other side.

* * * * *